United States Patent [19]
Romans

[11] 3,775,656
[45] Nov. 27, 1973

[54] PLATFORM STABILIZATION SYSTEM
[75] Inventor: Gleason Romans, Tulsa, Okla.
[73] Assignee: Aviation, Inc., Tulsa, Okla.
[22] Filed: May 22, 1972
[21] Appl. No.: 255,676

[52] U.S. Cl. ............................................. 318/649
[51] Int. Cl. ............................................. B64c 17/06
[58] Field of Search ............................ 318/648, 649

[56] References Cited
UNITED STATES PATENTS
2,490,628   12/1949   Isserstedt ........................... 318/649
2,551,069   5/1951    Strother ............................. 318/649 X
2,523,267   9/1950    Aschenbrenner .................... 318/649

Primary Examiner—B. Dobeck
Attorney—William S. Dorman

[57] ABSTRACT

A platform stabilization system to be carried by a movable vehicle comprising gimbal means operably connected between the vehicle and the platform to provide two degrees of rotational freedom of the platform with respect to the vehicle, electromagnetic erection means to effect platform erection, sensing means secured to the platform for determination of unlevel conditions and electronic control means operably connected between the sensing means and the erection means, whereby upon the sensing of any out-of-level condition of the platform, the sensing means provides an electrical power to create an electromagnetic field in the erection means thereby effecting erection of the said platform to a level condition. The platform stabilization system may also be used for erection of a gyroscope stabilized platform.

11 Claims, 3 Drawing Figures 3,775,656

PLATFORM STABILIZATION SYSTEM

BACKGROUND OF THE INVENTION

1. Field of the Invention

This invention relates to platform stabilization systems to be carried by movable vehicles and more particularly, but not by way of limitation, to a camera platform stabilization system carried by an aircraft, the said stabilization system effecting platform erection entirely by electromagnetic forces, the said system being particularly designed and constructed for effecting smooth erection of the platform when an out-of-level condition exists in the platform.

2. Description of the Prior Art

Camera platform erection and stabilization systems are normally of a combined electrical and mechanical operation having a plurality of servo motors secured to a plurality of screw-jack type mounts between the camera platform and the vehicle carrying the said camera whereby upon the sensing of an out-of-level condition, electrical power is applied to the servo motors thereby raising or lowering the screw-jacks to erect the said camera back to a level position. Other stabilization means presently available simply consist of mounting the camera in a gimbal arrangement and provoding on the top of said camera, a level indicator consisting of an air bubble suspended in fluid whereby upon indication of an out-of-level condition a camera operator physically moves the camera back to a level condition. However, these types of camera stabilization means and method have certain inherent disadvantages. The devices which utilize servo motors connected to screw-jacks at the base of the camera platform normally utilize servo motors connected to four independently rectangularly arranged screw-jacks at the base of the camera whereby to effect a pitch or a roll correction, at least two of the screw-jack motors will have to operate simultaneously and by the exact same amount in order to keep the camera resting on its four point base. It is readily seen that if one of the said servo motors operates slightly faster than its corresponding servo motor, this will result in the camera resting on only three points, leaving the fourth point out of contact with the camera, thereby creating an unbalanced condition. It is further noted that if a three point system is employed, to effect a purely pitch correction or a purely roll correction will require the cooperation of at least two of the servo motors operating at different speeds thereby requiring a complex control means. The manual method of holding the camera level has the obvious disadvantages of human reaction times and dexterity in addition to the tying up of the camera operator for the sole purpose of holding the camera level.

SUMMARY OF THE INVENTION

The present invention contemplates a novel platform stabilization system designed and constructed for overcoming the above disadvantages. The present invention utilizes the conventional gimbal mount of the camera platform inside the aircraft but provides a novel electromagnetic erection means for automatically stabilizing the camera in the level condition. Electromechanical sensing means are secured to the platform itself for automatically sensing an out-of-level condition. The output of the sensing devices are electrically connected into an electronic control system which is mounted on the platform itself. The output of the control system is electrically connected to a plurality of electromagnetic coils having movable cores disposed therein whereby upon a sensing of an out-of-level condition, the control means will provide electrical power to the electromagnetic coils thereby creating an electromagnetic field which operates on the core disposed within the coils thereby effecting erection of the platform within the gimbal mounting. The control unit is provided with circuitry to create a dampening effect to avoid rapid or jerking movement of the platform while the unit is in operation. The unit may also be provided with a stabilizing gyroscope rotatably secured within the platform for additional stability and smoothness of operation. It is readily seen that the present invention completely eliminates the need for servo motors or mechanical means to provide erection of the system thereby greatly increasing the reliability of the said system over those employing servo motor devices. The operation of the present invention is virtually automatic, thereby either eliminating the need for a separate camera operator or if the camera operator is utilized, the present system will free the said operator from having to constantly monitor the level condition of the camera thereby allowing him to perform additional duties during a particular photographic run.

DESCRIPTION OF THE DRAWINGS

Other and further advantageous features of the present invention will hereinafter more fully appear in connection with a detailed description of the drawings in which.

DETAILED DESCRIPTION

Figure 1:
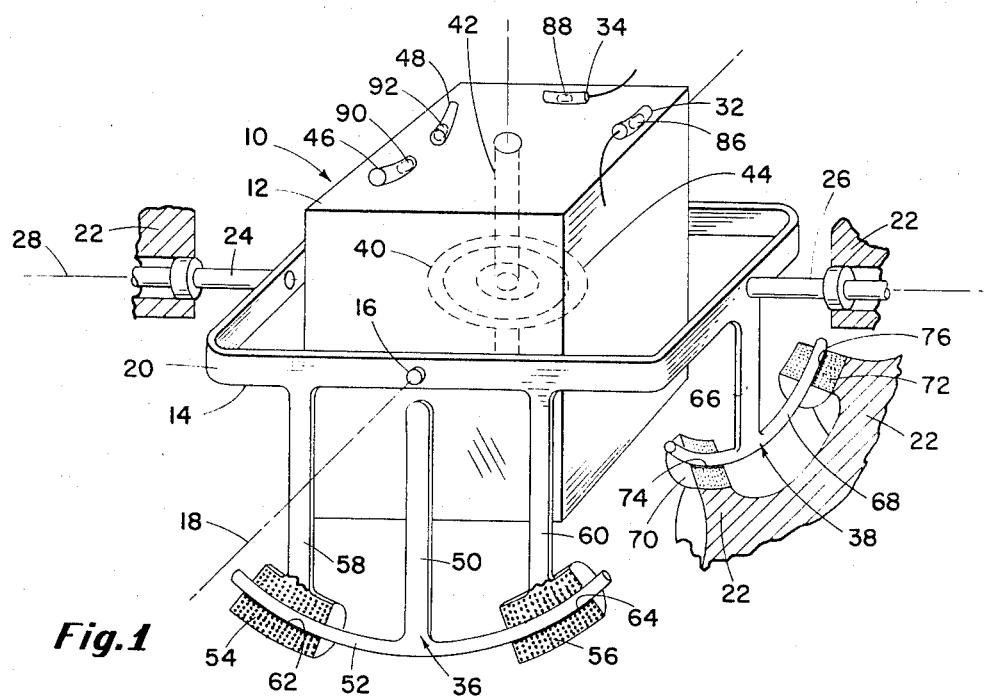
FIG. 1 is a perspective view of a camera platform having a platform stabilization system embodying the present invention.

Referring to the drawings in detail, reference character 10 generally indicates a platform stabilization system carried by a movable vehicle. The system 10 comprises a platform 12 for containing a camera (not shown) or the like which of necessity for proper operation must be kept level in a moving vehicle such as an aircraft (also not shown). The platform 12 is rotatable secured within a gimbal 14 by a pair of substantially identical oppositely disposed bearing mounted studs 16, one of which is shown in FIG. 1. The platform 12 is therefore freely rotatable with respect to the gimbal 14 about an axis 18 which is in concentric alignment with the bearing mounted studs 16. The gimbal 14 comprises a substantially rectangular frame member 20 which has a sufficient length with respect to the platform 12 to allow freedom of rotation of the platform 12 within the gimbal frame 20 about the axis 18 as hereinbefore set forth. The gimbal frame 20 is rotatably secured to the vehicle frame which is represented by reference characters 22 by means of a pair of substantially identical oppositely disposed bearing mounted stud members 24 and 26. The gimbal frame 20 may therefore be freely rotatable about an axis 28 which is coincident with the centerline axis of the stud members 24 and 26, the said axis 28 being perpendicular to the axis 18 by which the platform 12 may be rotated within the gimbal frame 20. It should be noted that the shape of the gimbal frame 14 as described herein is rectangular, but the shape of the said frame may be of any polygonic shape suitable for carrying a particular platform therein. For ease of description herein, the axis of rotation 28 will be referred to as the roll axis, and the axis of rotation 18 perpendicular thereto and intersecting therewith will be referred to as the pitch axis. It is readily seen that the platform 12 does not have rotational freedom of movement about a vertically disposed yaw axis 30 which is perpendicular to and intersecting with the roll axis 28 and the pitch axis 18.

A gravity sensitive roll sense switch 32 is secured to the platform 12 for sensing an out-of-level condition at the platform 12 about the roll axis 28 as will be hereinafter set forth. A substantially identical gravity sensitive pitch sense switch 34 is secured to the platform 12 for sensing an out-of-level condition of the platform 12 about the pitch axis 18. A roll erection means generally indicated by reference character 36 is operably connected between the gimbal frame 20 and the platform 12 for effecting erection of the platform 12 as will be hereinafter set forth. A pitch erection means 38 is operably connected between the vehicle 22 and the gimbal frame 20 for effecting platform erection when an out-of-level condition is sensed about the pitch axis 18 as will be hereinafter set forth.

A motor driven gyroscope 40 comprising an elongated vertically disposed shaft 42 and an annular rotating wheel 44 secured thereto, the plane of the wheel 44 being perpendicular to the vertically disposed shaft 42 is rotatably secured within the platform 12 by suitable roller bearings (not shown). The rotary shaft 42 has its axis of rotation coincident with the yaw axis 30 of the platform system. The plane of the annular wheel 44 of the gyroscope 40 is disposed coincident with the plane formed by the pitch axis 18 and the roll axis 28 of the platform erection system. A pair of substantially identical gravity sensitive slop switches 46 and 48 are secured to the platform 12 for sensing extreme out-of-level conditions of the platform about the roll axis 28 for purposes that will be hereinafter set forth.

It should be pointed out at this time that the platform erection system 10 may be utilized with or without the stabilization gyro 40. However, additional platform stabilization may be provided by the installation of the vertically disposed gyroscope such as depicted in FIG. 1. It is also noted that any attempt to rotate the gimbal frame 20 about the roll axis 28 will cause a resultant movement of the platform 12 with the gyroscope 40 installed therein about the pitch axis 18 due to the angular momentum of the rotating massive wheel 44. Likewise, any attempt to rotate the platform 12 about the pitch axis 18 will result in a rotational movement of the platform 12 about the roll axis 28 also due to the angular momentum of the wheel 44. It is for the above reason that the electromagnetic roll erection means 36 is disposed in a manner to effect erection forces about the pitch axis 18 which will result in movement of the platform 12 about the roll axis 28. Likewise, it is for the same reason that the electromagnetic pitch erection means 38 is disposed in such a manner as to effect pitch erection forces about the roll axis 28 thereby resulting in movement of the platform 12 about the pitch axis 18. The direction of the resulting movement of the platform about an axis perpendicular to the axis about which the force was applied is dependent upon the rotational direction of the gyroscope 40 about the yaw axis 30 of the platform erection system. The gyroscope 40, once set in motion, will tend to stabilize the platform in a level condition. However, due to the earth's rotation and the movement of the vehicle, normal precession of the gyroscope will tend to slowly move the platform 12 to an out-of-level condition. This out-of-level condition will then be sensed by the roll and pitch means 32 and 34, respectively, and be corrected in turn by the electromagnetic roll erection means 36 and the electromagnetic pitch erection means 38.

The electromagnetic roll erection means 36 comprises an elongated bar 50 having one end thereof rigidly secured to the stud 16 which is rotatably mounted within the gimbal frame 20 as hereinbefore set forth. The elongated bar 50 is secured to the stud in such a manner that when the platform 12 is rotated about the pitch axis 18 the elongated bar 50 will rotate therewith. An arcuate shaped rod 52 is secured to the opposite end of the elongated bar 50 and at substantially right angles thereto thereby forming an inverted T-shaped assembly as depicted in FIG. 1. The arcuate rod 52 is connected and disposed in such a manner that every point along the centerline axis of the said rod 52 is equal distance from the pitch axis 18 of the platform erection system whereby upon rotation of the platform 12 within the gimbal 14, the arcuate rod 50 will describe an arc about the said pitch axis 18. The electromagnetic roll erection means 36 also comprises a pair of spaced substantially identical annular shaped electromagnetic coils 54 and 56 which are secured to the gimbal frame 20 by means of a pair of substantially identical brackets 58 and 60, respectively. The electromagnetic coil 54 is provided with an arcuate shaped center core aperture 62 for receiving one end of the arcuate rod 52 therein. The electromagnetic core 56 is likewise provided with an arcuate shaped core aperture 64 for receiving the opposite end of the arcuate rod 52 therein whereby again, upon rotation of the platform 12 with respect to the gimbal 14, the elongated bar 50 will rotate with the camera carrying with it the arcuate rod 52 having each end thereof freely passing through the electromagnetic core apertures 62 and 64 for purposes that will be hereinafter set forth.

The pitch electromagnetic erection means 38 comprises an elongated bar 66 having one end thereof secured to the gimbal frame 20 at the point of rotation thereof with the vehicle 22 about the rotation shaft 26. An arcuate rod 68 is secured at the centerpoint thereof to the opposite end of the elongated rod 66 and at substantially right angles thereto thereby forming an inverted T-shaped assembly as depicted in FIG. 1. The arcuate rod 68 is constructed and disposed in such a manner that any point along the axis of the said rod 68 is equal distance from the roll axis 28 of the platform erection system. The pitch erection means 38 also comprises a pair of substantially identical oppositely disposed annular shaped electromagnetic coils 70 and 72 which are secured to the vehicle 22. The electromagnetic coil 70 is provided with an arcuate shaped core aperture 74 for receiving one end of the arcuate rod 68 therethrough. The electromagnetic coil 72 is provided with an arcuate shaped core aperture 76 for receiving the opposite end of the arcuate rod 68 therethrough whereby upon rotation of the gimbal frame 20 about the roll axis 28 of the platform system, the arcuate rod 68 will rotate with the gimbal frame 20 thereby describing an arc about the roll axis 28, the ends of the arcuate rod 68 freely passing within the coil apertures 74 and 76 for purposes that will be hereinafter set forth.

Figure 2:
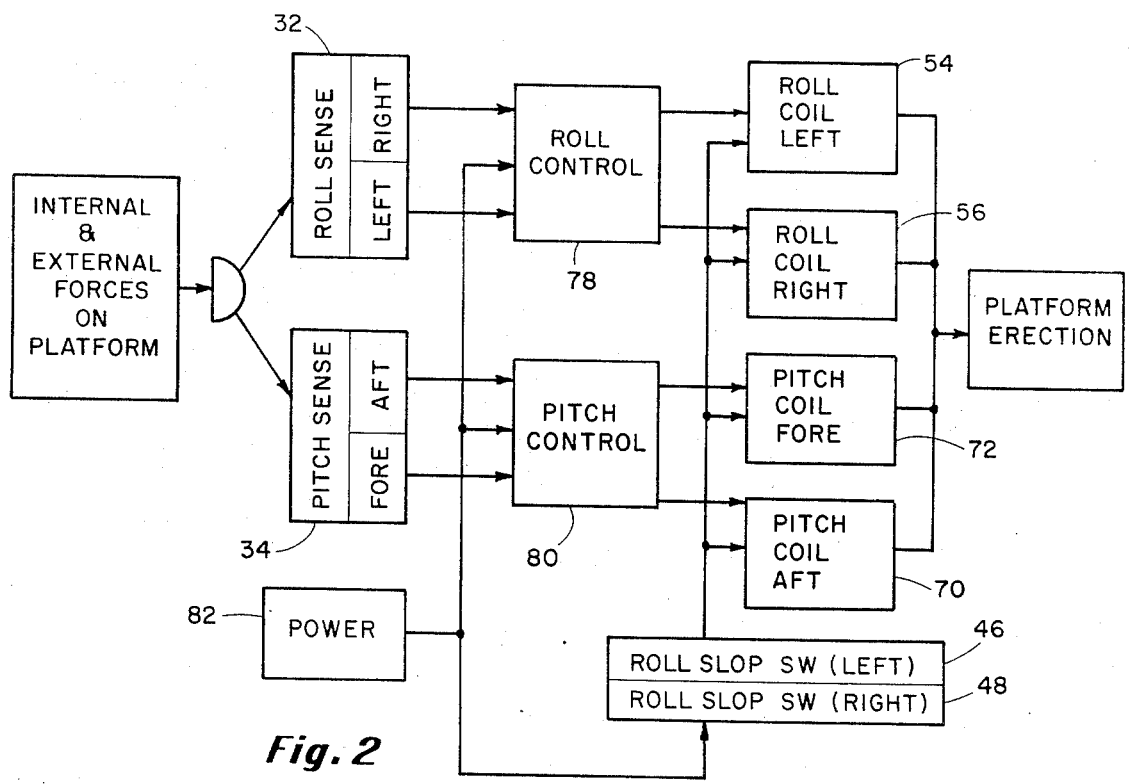
FIG. 2 is a functional block diagram depicting the functional operation of the platform stabilization system embodying the invention.

Referring now to FIG. 2, the platform erection system 10 also comprises an electronic roll control means 78 which is operably connected with the output of the roll sense means 32 and an electronic pitch control means 80 which is operably connected to the output of the pitch sensing means 34. The outputs of the roll control 78 are operably connected to the electromagnetic coils 54 and 56 which will be hereinafter referred to as the roll coil left and the roll coil right, respectively. Likewise, the outputs of the pitch control means 80 are operably connected to the electromagnetic coils 70 and 72 which will be hereinafter refered to as the pitch coil aft and the pitch coil fore, respectively. Therefore, when external or internal forces acting on the platform cause the platform 12 to move to an out-of-level position, this out-of-level position will be sensed by the gravity sensitive sensing means 32 and 34, thereby causing an input signal to be provided to the roll control means 78 and the pitch control means 80, respectively. If the out-of-level condition of the platform 12 is to the right about the roll axis 28, then the roll control means 78 would provide output power to the roll coil left 54 which would tend to pull the arcuate shaped rod 52 through the coil aperture 62 thereby providing a leveling force on the platform 12 about the roll axis 28. Likewise, if the out-of-level condition of the platform 12 was in an aft direction about the pitch axis 18, then the output of the pitch control means 80 would provide power to the pitch coil fore 72 thereby tending to pull the arcuate rod 68 through the coil aperture 76 thereby providing a force to rotate the platform 12 about the pitch axis 18 to a level condition.

Figure 3:
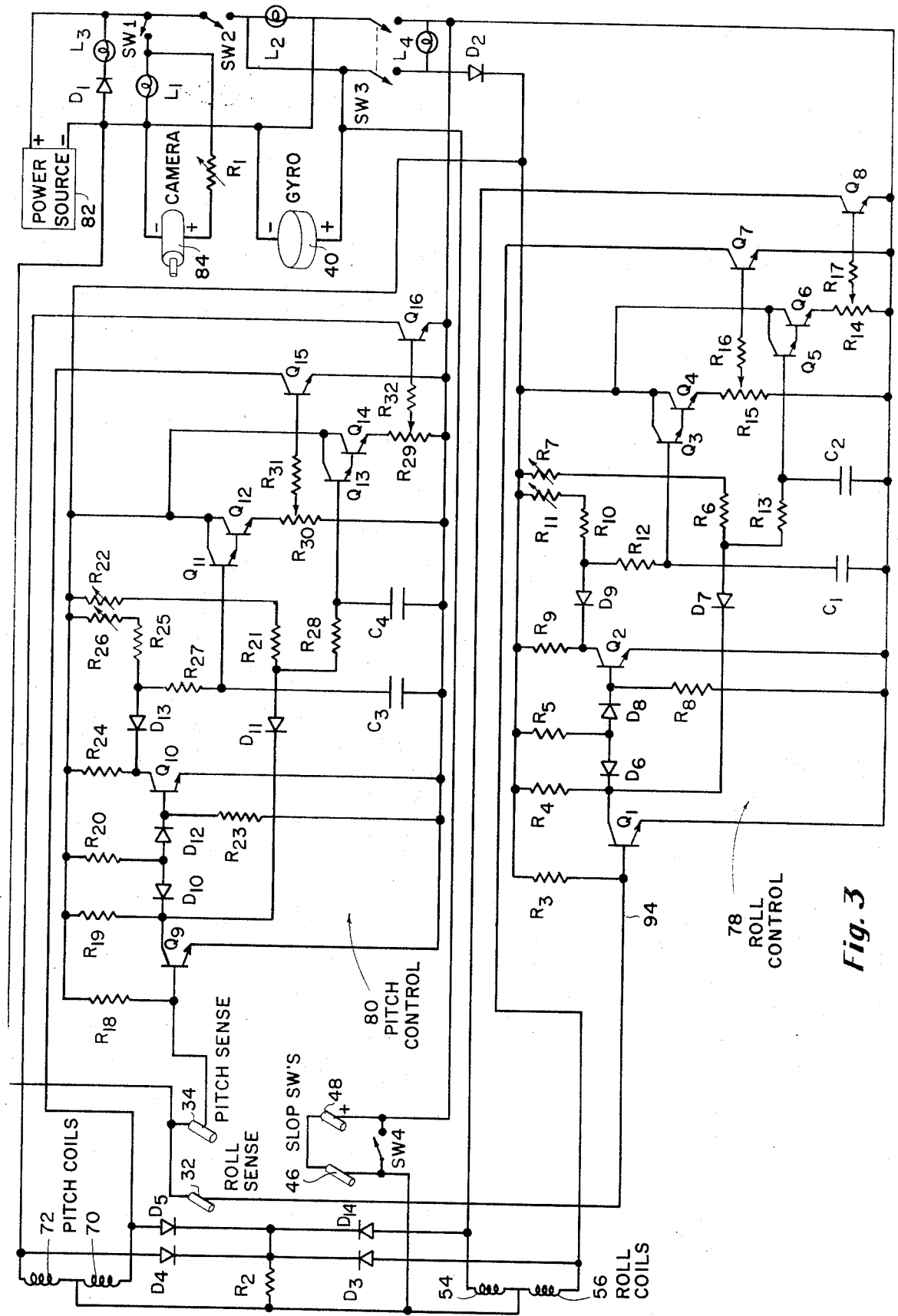
FIG. 3 is an electrical schematic diagram of the platform stabilization system.

Referring now to FIG. 3, the normal electrical power system 82 of the vehicle 22 is connected to provide electrical power for the motordriven gyroscope 40, a camera 84 which may be secured to the platform 12, and the platform stabilization system. The negative terminal of the camera 84 is directly connected to the negative output of the DC power source 82. The positive terminal of the camera 84 is connected to the positive output of the DC power source 82 through a single pole, single throw switch SW1 and a variable resistor R1 in series therewith. An indicator lamp L1 is connected across the power output terminals of the power source 82 in series with the switch SW1 to provide a power-on indication for the camera 84. The gyroscope 40 is connected across the output terminals of the DC power source 82, the positive lead thereof being in a series with a single pole, single throw switch SW2. An indicator lamp L2 is connected in parallel with the gyroscope 40 downstream from the switch SW2 for providing an indication when power is applied to the gyroscope 40. A reverse polarity indication lamp L3 is connected across the output leads of the DC power source 82 and in series with a diode D1 whereby if the output leads of the power source 82 are inadvertently reversed, the diode D1 will be forwardly biased thereby allowing elimination of the lamp L3.

The pitch control circuit 80 and the roll control circuit 78 are connected in parallel to the DC power source 82 through a double pole, single throw switch SW3, the poles of the said switch SW3 being ganged for simultaneous operation thereof. A reverse polarity protection diode D2 is connected between the positive output terminal of the power source 52 and the power input terminals of the roll control circuit 78 and the pitch control circuit 80. An indicator lamp L4 is connected in parallel with the pitch and roll control circuits downstream from the switch SW3 to provide indication when the said pitch and roll control circuits have power applied thereto.

The roll sense means 32 consists of a single pole, double throw elongated mercury switch which is horizontally disposed and secured to the platform 12. The axis of the said switch 32 is parallel to the pitch axis 18. A mercury bubble 86 is suspended within the switch 32 in such a manner that when the platform 12 is in a level condition with respect to the roll axis 28, the mercury bubble 86 will not be in contact with either end of the said switch 32. The said switch 32 has a pair of contacts oppositely disposed at either end thereof, and a center contact which is constantly in direct connection with the mercury bubble 86. One end of the said mercury switch 32 is dead-ended, the opposite end thereof being directly connected to the negative output terminal of the DC power source 82 while the center contact of the switch 32, which is in direct connection with the mercury bubble 86, is directly connected to the input of the roll control circuit 78.

The pitch sensing means 34 consists of a substantially identical elongated mercury switch which is horizontally disposed and secured to the platform 12, the axis of the elongated switch 34 being parallel to the roll axis 28 of the system. The mercury switch 34 is also a single pole, double throw switch having a gravity sensitive mercury bubble 88 disposed therein. Again, the contact on one end of the switch 34 is dead-ended, the contact at the opposite end of the said switch being directly connected to the negative output terminal of the DC power source 82. The center contact of the switch 34, which is in direct connection with the mercury bubble 88, is operably connected to the input terminal of the pitch control circuit 80.

Therefore, it is readily apparent that when the platform 12 is in an out-of-level condition with respect to the roll axis 28 in one direction, the mercury bubble 86 will come into contact with the terminal which is connected to the negative output terminal of the power source 82 thereby, in effect, connecting the input terminal of the roll control 78 to the negative output terminal of the DC power source 82. When the platform 12 is in an out-of-level condition about the roll axis 28 in the opposite direction, or when the platform 12 is in a level condition, the bubble 86 will not be in contact with the connected end of the switch 32 thereby disconnecting the input of the roll control circuit 78 with the negative output terminal of the power source 82. Therefore, arbitrarily taking the connected side of the switch 32 as being the left side, when the platform 12 becomes out-of-level to the left, about the roll axis 28, the switch 32 will close, thereby connecting the input of the roll control circuit 78 directly into the negative output of the DC power source 82. The roll control circuit 78 will then, as will be hereinafter set forth, provide power to the roll coil right 56, thereby creating an electromagnetic field which will tend to pull the arcuate rod 52 therethrough which will in turn force the platform 12 to the right about the roll axis 28 thereby leveling the said platform. On the other hand, when the platform 12 is in a level condition, or is an out-of-level condition to the right of the roll axis 28, the input terminal of the roll circuit 78 will be disconnected from the negative output terminal of the power source 82, and as will be hereinafter set forth, the output of the roll control circuit 78 will provide power to the roll coil left 54 which will tend to force the platform 12 to rotate to the left about the roll axis 28. Since the roll control circuit 78 is constantly receiving indications of out-of-level conditions, due to both out-of-level conditions and momentary contacts of the bubble 86 with the connected end of the switch 32 as a result of vehicle vibration causing the said bubble 86 to "jitter" within the switch 32, the roll coils 54 and 56 are constantly receiving alternate corrective output signals from the roll control circuit 78. The circuitry within the roll control circuit 78, as will be hereinafter set forth, is provided with appropriate delay circuits and minimum starting output currents which creates dampening effects within the roll coils 54 and 56 to avoid rapid corrective movements on the platform 12.

Likewise, arbitrarily taking the aft end of the switch 34 as the contact that is directly connected to the negative output terminal of the DC power source 82, when the platform 12 is in an out-of-level condition in an aft direction about the pitch axis 18, the mercury bubble 88 within the switch 34 will make contact with the connected end of the said switch 34 thereby directly connecting the input terminal of the pitch control circuit 80 with the negative output terminal of the DC power source 82. The pitch control circuit 80 will then provide an output electrical power to the pitch coil fore 72 thereby creating an electromagnetic field therein which tends to pull the arcuate rod 68 through the coil aperture 76 which will force the platform 12 in a forward direction about the pitch axis 18 thereby leveling the said platform 12.

However, when the platform 12 is in an out-of-level condition forward about the pitch axis 18, or when the said platform is in a level condition, the mercury bubble 88 will not be in contact with the connected side of the switch 34 which thereby disconnects the input terminal of the pitch control circuit 80 with the negative output terminal of the DC power source 82. The pitch control circuit 80 will therefore provide an output electrical power to the pitch coil aft 70 which will in turn create an electromagnetic field about the coil 70 which will tend to pull the arcuate rod 68 through the coil aperture 74 thereby applying a rotary force to the platform 12 in an aft direction about the pitch axis 18. Therefore, it is readily seen that the output of the pitch control circuit 80 will be constantly applying electrical power to one of the coils 70 or 72. The pitch control circuit 80 also is provided with circuitry, as will be hereinafter set forth, which creates a dampening effect within the pitch coils 70 and 72 to avoid rapid corrective movement of the platform 12.

The roll slop switch 46 consists of a single pole, single throw normally closed mercury switch having a gravity sensitive mercury bubble 90 disposed therein. The switch 46 is secured to the platform 12 the axis thereof being in substantial alignment with the pitch axis 18. However, the end of the switch not provided with the contact is tilted slightly upward so that the switch 46 will not open except when the platform 12 is in an extreme out-of-level condition to the left about the roll axis 28. The slop switch 48 is substantially identical to the switch 46 and oppositely disposed therefrom. The slop switch 48 is provided with a mercury bubble 92 and is disposed in such a manner that the switch will remain closed except when the platform 12 is in an extreme out-of-level condition to the right about the roll axis 28. The said slop switches 46 and 48 are connected in series with the switch SW2 directly to the positive output terminal of the DC power source 42. The switch 46 is connected to the positive end of each of the pitch coils 70 and 72 and the roll coils 54 and 56. A single pole, single throw bypass switch SW4 is connected in parallel with the stop switches 46 and 48 whereby upon closure of the switch SW4, the said slop switches 46 and 48 are bypassed. Therefore, positive power is applied to the pitch coils and the roll coils whenever the switch SW4 is closed or when the switch SW4 is open, and the normally closed slop switches 46 and 48 are closed. It is readily apparent that the purpose for the said slop switches 46 and 48 are to disconnect power from the pitch and roll coils when the aircraft or vehicle 22 enters an extreme bank or roll condition thereby preventing the erection system from attempting to correct the extreme out-of-level condition of the platform 12 while the said vehicle is in a turning bank or the like.

Four diodes, D2, D3, D4 and D5 are each connected in series with the negative side of the coils 54, 56, 70 and 72, respectively, the output of each of the said diodes being connected to one side of the load resistor R2, the opposite side of the said load resistor R2 being connected to the positive side of the pitch and roll coils thereby providing a barrier strip for the negative side of the said pitch roll coils.

The roll control circuit 78 comprises an input terminal 94 which is operably connected between the roll sense switch 32 and the base of a PNP type transistor Q1. The base of the transistor Q1 is also connected to the output of the diode D2 through a resistor R3, the output of the said diode D2 providing the said positive electrical power for the roll control circuit 78. The collector for the transistor Q1 is also connected to the output of the diode D2 through a resistor R4, and the emitter for the transistor Q1 is operably connected to the negative output terminal of the DC power source 82 through the switch SW3. The collector of the transistor Q1 is also connected to the output of the diode D6, the input of said diode being connected to the output of the diode D2 through a resistor R5. The collector of the transistor Q1 is also connected to the output of a diode D7, the input of said diode D7 being connected to the output of the diode D2 through a fixed resistor R6 and a variable resistor R7 connected in series therewith. The input of the diode D6 is also connected to the input of a diode D8, the output of the said diode D8 being operably connected to the base of a PNP type transistor Q2. The base of the transistor Q2 is also connected to the negative output terminal of the DC power source 82 through a resistor R8, and the switch SW3 in series therewith. The collector of the transistor Q2 is connected to the output of the diode D2 through a fixed resistor R9. The collector of the transistor Q2 is also connected to the output of a diode D9, the input of the said diode D9 being operably connected to the output of the diode D2 through a fixed resistor R10 and a variable resistor R11 in series therewith. The emittor of the transistor Q2 is operably connected with the negative output terminal of the DC power source 82 through the switch SW3. The input of the diode D9 is operably connected to the base of a transistor Q3 through a fixed resistor R12, the base of the said transistor Q3 being operably connected to the negative output terminal of the DC power source through a capacitor C1 and the switch SW3 connected in series therewith. The collector of the transistor Q3 is operably connected to the output of the diode D2 and the emitter of the said transistor Q3 is operably connected to the base of a PNP type transistor Q4. The input of the diode D7 is operably connected to the base of a transistor Q5 through a fixed resistor R13, the base of the said transistor Q5 being operably connected to the negative output terminal of the DC power source 82 through a capacitor C2 and the switch SW3 connected in series therewith. The collector of the transistor Q5 is operably connected to the output of the diode D2 and the emitter of the transistor Q5 is operably connected to the base of a PNP type transistor Q6. The collector of the transistor Q6 is operably connected to the output of the diode D2. The emitter of the transistor Q4 is operably connected to the negative output terminal of the DC power source 82 through a voltage divider potentiometer R15 and the switch SW3 connected in series therewith. The variable center tap of the potentiometer R15 is connected to the base of a PNP type transistor Q7 through a fixed load resistor R16 while the emitter of the transistor Q6 is similarly connected to the negative output terminal of the DC power source 82 through a variable voltage dividing potentiometer R14 and the switch SW3 connected in series therewith. The variable center tap of the potentiometer R14 is connected to the base of a PNP type transistor Q8 through a fixed load resistor R17. The emittors of the transistors Q7 and Q8 are connected to the negative output terminal of the DC power source 82 through the switch SW3. The collector of the transistor Q7 is operably connected to the negative side of the roll coil right 56 and constitutes the output of the roll control circuit 78 when an out-of-level condition of the platform 12 is sensed by the sensing means 32 indicating an out-of-level condition to the left of the platform 12 about the roll axis 28. The collector of the transistor Q8 is operably connected to the negative side of the roll coil left 54 and constitutes the output of the roll control circuit 78 when an out-of-level condition of the platform 12 exists to the right about the roll axis 28 as will be hereinafter set forth.

The pitch control circuit 80 is substantially identical to the roll control circuit 78, the input terminal 96 of the said pitch control circuit 80 being operably connected between the pitch sensing switch 34 and the base of a PNP type transistor Q9. The base of the transistor Q9 is also connected to the output of diode D2 through a resistor R18, the output of the said diode D2 providing the positive electrical power for the roll control circuit 78. The collector for the transistor Q9 is also connected to the output of the diode D2 through a resistor R19, and the emitter for the transistor Q9 is operably connected to the negative output terminal of the DC power source 82 through the switch SW3. The collector of the transistor Q9 is also connected to the output of the diode D10, the input of said diode being connected to the output of the diode D2 through a resistor R20. The collector of the transistor Q9 is also connected to the output of the diode D11, the input of said diode D11 being connected to the output of the diode D2 through a fixed resistor R21 and a variable resistor R22 connected in series therewith. The input of the diode D11 is also connected to the input of a diode D12, the output of the said diode D12 being op- erably connected to the base of a PNP type transistor Q10. The base of the transistor Q10 is also connected to the negative output terminal of the DC power source 82 through a resistor R23, and the switch SW3 in series therewith. The collector of the transistor Q10 is connected to the output of the diode D2 through a fixed resistor R24. The collector of the transistor Q10 is also connected to the output of a diode D13, the input of the said diode D13 being operably connected to the output of the diode D2 through a fixed resistor R25 and a variable resistor R26 in series therewith. The emitter of the transistor Q10 is operably connected with the negative output terminal of the DC power source 82 through the switch SW3. The input of the diode D13 is operably connected to the base of a transistor Q11 through a fixed resistor R27, the base of the said transistor Q11 being operably connected to the negative output terminal of the DC power source through a capacitor C3 and the switch SW3 connected in series therewith. The collector of the transistor Q11 is operably connected to the output of the diode D2 and the emitter of the said transistor Q11 is operably connected to the base of a PNP type transistor Q12. The input of the diode D11 is operably connected to the base of a transistor Q13 through a fixed resistor R28, the base of the said transistor Q13 being operably connected to the negative output terminal of the DC power source 82 through a capacitor C4 and the switch SW3 connected in series therewith. The collector of the transistor Q13 is operably connected to the output of the diode D2 and the emitter of the transistor Q13 is operably connected to the base of a PNP type transistor Q14. The collector of the transistor Q14 is operably connected to the output of the diode D2. The emitter of the transistor Q14 is operably connected to the negative output terminal of the DC power source 82 through a voltage divider potentiometer R29 and the switch SW3 connected in series therewith. The variable center tap of the potentiometer R29 is connected to the base of a PNP type transistor Q16 through a fixed load resistor R32 while the emitter of the transistor Q12 is similarly connected to the negative output terminal of the DC power source 82 through a variable voltage dividing potentiometer R30 and the switch SW3 connected in series therewith. The variable center tap of the potentiometer R30 is connected to the base of a PNP type transistor Q15 through a fixed load resistor R31. The emitters of the transistors Q15 and Q16 are connected to the negative output terminal of the DC power source 82 through the switch SW3. The collector of the transistor Q15 is operably connected to the negative side of the pitch coil aft 70 and constitutes the output of the pitch control circuit when an out-of-level condition of the platform 12 is sensed by the sensing means 34 indicating a forward out-of-level condition of the platform 12 about the pitch axis 18. The collector of the transistor Q16 is operably connected to the negative side of the pitch coil fore and constitutes the output of the pitch control circuit 80 when an aft out-of-level condition of the platform 12 exists about the pitch axis 28 as will be hereinafter set forth.

In operation, the camera 84 may be installed on the platform 12, or may be constructed as an integral part thereof. The platform with camera installed should then be balanced about the roll axis 28 and the pitch axis 18. It should be noted that the orientation of the gimbal 14 was arbitrarily described as shown in FIG. 1 but may be rotated about the yaw axis by 90° for ease of installation in the vehicle 22 or the aircraft. After balancing the installed platform 12, the existing DC power source 82 should be connected to the system. The switch SW1 may then be closed and the variable resistor R1 may be adjusted to provide proper voltage supply to the camera 84. After the camera 84 has been installed in the platform 12, and the said platform balanced about both the pitch axis and the roll axis, the switch SW2 may be closed, thereby activating the stabilization gyroscope 40. The platform erection system 10 may then be activated by closing the switch SW3, thereby providing electrical power to the pitch control circuit 80, the roll control circuit 78, the roll and pitch sensing means 32 and 34, respectively, and the roll and pitch coils 54, 56, 70 and 72. The bypass switch SW4 may be closed thereby cutting the slop switches 46 and 48 out of the system until platform erection has taken place. Once the platform 12 has been properly erected to a substantially level condition, the switch SW4 may then be opened, thereby placing the series connected slop switches 46 and 48 into the system. So long as the platform 12 is in a substantially level condition with no excessive side forces thereon, positive direct current electrical power will be supplied through the normally closed slop switches 46 and 48 to the positive side of the roll and pitch coils.

If the platform 12 moves into an out-of-level condition to the left about the roll axis 28, the mercury bubble 86 will make contact with the connected side of the switch 32, which directly connects the input terminal 94 of the roll control circuit 78 with the negative output terminal of the DC power source, thereby completing an electrical circuit through the resistor R3 of the roll control circuit 78. The transistor Q1 will thereby be turned on allowing current to flow through the said transistor to ground. If the negative output terminal of the DC power source is considered at zero voltage level, then the collector of the transistor Q1 will be at substantially zero voltage. Any electrical charge which has built up within the capacitor C2 will therefore be discharged through the resistor R13, the diode D7, and the transistor Q1 which at that point will create a reverse bias of the transistors Q5 and Q6 which will in turn cause a reverse bias of the transistor Q8, thereby turning Q8 off. Since the transistor Q2 is in an "off" position, current will be allowed to flow from the output of the diode D2, across the variable resistor R11, through the fixed resistor R10, through the fixed resistor R12, thereby applying voltage to the capacitor C1 which will begin a slow charge within the said capacitor C1. The delay in the charge of the capacitor C1 is directly effected by the setting of the variable resistor R11. As the charge builds up within C1, the transistor Q3 will be turned on, which will, in turn, turn on the transistor Q4 thereby allowing current to flow from the diode D2 through the transistor Q4 and through the potentiometer R15, thereby providing a sufficient voltage at the base of the transistor Q7 which will turn the transistor Q7 on, thereby in effect providing a substantially direct connection of the negative output terminal of the DC power source 82 through the transistor Q7 to the negative side of the roll coil right 56. Current will therefore flow through the roll coil right 56 thereby creating an electromagnetic field thereabout, which will tend to pull the arcuate bar 52 of the roll erection means 36 therethrough. Referring now to FIG. 1, as the arcuate bar 52 is pulled through the coil 56, a forward rotational force is applied to the platform 12 about the pitch axis 18. However, due to the angular momentum of the rotating gyroscope wheel 44, the resulting effect of the said force about the pitch axis will be at right angles thereto and will effect a right hand roll of the gimbal 14 about the roll axis 28 thereby tending to level the platform 12.

When the platform 12 is leveled to the point or past the point where the mercury bubble 86 disengages the contact side of the switch 32, the said switch 32 will open, thereby disconnecting the input terminal 94 of the roll control circuit 78 with the DC power source 82. At this point, the transistor Q1 will be reverse biased, or turned off, thereby allowing an electrical circuit to be completed from the diode D2 through the resistor R5, through the diode D8, and the resistor R8 to the negative output terminal of the DC power source 82. A voltage proportional to the ratio of the resistors R5 and R8 will be supplied to the base of the transistor Q2, thereby turning the said transistor Q2 on, which in turn causes the collector of the said transistor Q2 to be at a substantially zero voltage state. The capacitor C1 will then discharge through the resistor R12, the diode D9, and the transistor Q2, thereby turning the transistors Q3 and Q4 off which in turn disconnects voltage to the base of the transistor Q7, thereby turning the said transistor Q7 off. Current will now be allowed to flow from the diode D2 through the variable resistor R7, through the fixed resistor R6, and through the fixed resistor R13, thereby slowly charging the capacitor C2. The rate of charge of the capacitor C2 is directly controlled by an adjustment of the variable resistor R7. As the capacitor C2 builds a charge, the transistors Q5 and Q6 are thereby turned on, completing a circuit from the diode D2 through the transistor Q6 and through the voltage divider potentiometer R14 to the negative output terminal of the DC power source 82. At this point, a sufficient voltage level is present at the base of the transistor Q8 to turn the said transistor Q8 on, thereby completing the circuit between the negative output terminal of the DC power source 82 and the negative side of the roll coil left 54. Current is now allowed to flow through the roll coil left 54 thereby creating an electromagnetic field thereabout which tends to pull the arcuate rod 52 therethrough thereby creating a resulting rectifying force on the platform 12 turning the said platform 12 to the left about the roll axis 28.

When the platform 12 is in an out-of-level condition in an aft direction about the pitch axis 18, the mercury bubble 88 will come into contact with the connected side of the switch 34 thereby in effect connecting the input terminal 96 of the pitch control circuit 80 to the negative output terminal of the DC power source 82. The transistor Q9 will thereby be turned on, placing the collector of the said transistor Q9 at near zero voltage level which in turn will cause a rapid discharge of the capacitor C4 while at the same time a slow charge is being built within the capacitor C3. As the charge builds within the capacitor C3, the transistors Q11 and Q12 are turned on, thereby completing a circuit across the voltage divider potentiometer R30 which in turn biases the transistor Q15 in an "on" condition. As the capacitor C4 is discharged, the transistors Q13 and Q14 are turned off, which in turn, turns off the transistor Q16. As the transistor Q15 is turned on, as hereinbefore set forth, a circuit is completed through the pitch coil fore 72, thereby creating an electromagnetic field about the said coil 72. The arcuate rod 68 will then be pulled within the coil, thereby creating a force on the gimbal frame 20 in a left hand direction about the roll axis 28. Again, due to the angular momentum of the rotating wheel of the gyroscope 40, the resulting force created by the electromagnetic erection means 38 will cause a rotation of the platform 12 forward about the pitch axis 18, thereby erecting the said platform 12.

As the mercury bubble 88 breaks contact with the connected side of the mercury switch 34, the input terminal 96 of the pitch control circuit 80 will be disconnected from the negative output terminal of the power source 82, thereby turning the transistor Q9 off. The current flowing from the diode D2 through the resistors R20 and R23 will create a voltage level at the base of the transistor Q10 sufficient to turn the transistor Q10 on, thereby bringing the voltage level at the collector of the transistor Q10 to a substantially zero voltage level. The capacitor C3 will then quickly discharge through the resistor R27 and the diode D13 thereby turning off the transistors Q11 and Q12, which will in turn, turn off the transistor Q13. The capacitor C4 will slowly start to charge, thereby turning on the transistors Q13 and Q14, which in turn will turn on the transistor Q16, thereby creating a current flow through the pitch coil aft 70. The current flow through the pitch coil aft 70 will create an electromagnetic field thereabout which will tend to pull the arcuate rod 68 through the aperture 74 of the coil 70. This electromagnetic force on the arcuate rod 68 will be in a right hand direction about the roll axis 28. The resulting force due to the angular momentum of the gyroscope wheel 44 will effect an aft rotation or the platform 12 about the pitch axis 18 thereby erecting the said platform 12.

It is readily seen as a result of the description hereinbefore set forth that the variable resistors R7 and R11 of the roll control circuit 78 may be adjusted to create the desired delay in the build-up of electrical charge within the capacitors C1 and C2, respectively, thereby creating a dampening effect to avoid movement of the platform 12 in response to the out-of-level conditions sensed by the sensing means 32 and 34. It is also seen as a result of the description hereinbefore set forth that the variable voltage divider potentiometers R14 and R15 may be adjusted to provide a peak power commensurate with the internal and external forces acting on the platform 12. Likewise, the variable resistors R26 and R22 of the pitch control circuit 80 may be adjusted to provide a suitable delay in the building of a charge within the capacitors C3 and C4, respectively. Also, the variable voltage divider potentiometers R30 and R29 may be adjusted to provide a peak rectifying power commensurate with the internal and external forces acting on the platform 12.

From the foregoing, it will be apparent that the present invention provides a platform stabilization system particularly designed and constructed for providing smooth and efficient erection of the stabilized platform 12 when the said platform is moved to an out-of-level condition as a result of internal and external forces acting thereon. The novel platform stabilization system is simple and efficient in operation and economical and durable in construction.

Whereas the present invention has been described in particular relation to the drawings attached hereto, it should be understood that other and further modifications, apart from those shown or suggested herein, may be made within the spirit and scope of this invention.

What is claimed is:

1. A platform stabilization system for a platform carried by a movable vehicle and comprising an electrical power supply carried by the vehicle, gimbal means operably connected between the vehicle and the platform to provide 2° of rotational freedom of movement of the platform with respect to the vehicle, sensing means secured to the platform for determination of an out-of-level condition of the platform, electromagnet platform erection means operably connected between the platform and the vehicle, said erection means comprising magnetic coil means for creating a magnetic field and core means movable with respect to the coil means, and electronic control means operably connected between the sensing means and the erection means whereby upon the sensing of any out of level condition of the platform, the sensing means provides an electrical signal to the control means which in turn provides electrical power from the power supply to create an electromagnetic field within the magnetic coil means thereby acting upon the core means for effecting erection of said platform to a level condition.

2. A platform stabilization system as set forth in claim 1 wherein the sensing means comprises a first elongated mercury switch having a gravity sensitive mercury bubble suspended therein secured to the platform and disposed with the centerline axis of the switch being parallel to one of the rotational axes of the platform with respect to the vehicle and a second substantially identical second elongated mercury switch having a gravity sensitive mercury bubble suspended therein secured to the platform and disposed with the centerline axis thereof being parallel to the second axis of rotation of the platform with respect to the vehicle whereby the said switches will be closed when the platform is in an out-of-level condition in one direction, and the said switches will be open when the platform is in an out-of-level condition in the opposite direction.

3. A platform stabilization system as set forth in claim 1 wherein the gimbal means comprises a gimbal frame which is rotatably secured to the vehicle, the platform being rotatably connected to the gimbal frame, the axis of rotation of the platform with respect to the gimbal frame being disposed perpendicularly to the axis of rotation of the gimbal frame with respect to the vehicle.

4. A platform stabilization system as set forth in claim 3 wherein the electronic control means comprises a pair of substantially identical control circuits having the inputs thereof operably connected to the sensing means and the outputs thereof operably connected to the electromagnetic platform erection means, the first said control circuit for providing electrical power from the power supply to create an electromagnetic field within the erection means for effecting corrective rotation of the platform with respect to the gimbal frame and the second control circuit providing electrical power from the power supply to create an electromagnetic field within the erection means for effecting erection of the gimbal frame with respect to the vehicle.

5. A platform stabilization system for a platform carried by a movable vehicle and comprising an electrical power supply carried by the vehicle, gimbal means operably connected between the vehicle and the platform to provide two degrees of rotational freedom of movement of the platform with respect to the vehicle, sensing means secured to the platform for determination of an out-of-level condition of the platform, electromagnetic platform erection means operably connected to the platform, the gimbal means and the vehicle, and electronic control means operably connected between the sensing means and the erection means whereby upon the sensing of any out-of-level condition of the platform, the sensing means provides an electrical signal to the control means which in turn provides electrical power from the power supply to create an electromagnetic field within the erection means thereby effecting erection of the said platform to a level condition, wherein a motor driven stabilizing gyroscope is rotatably secured to the platform, the said gyroscope comprising an axle and massive wheel secured thereto, the plane of the said massive wheel being at right angles to the axis of the axle, the said axle being disposed within the platform having its axis mutually perpendicular to the rotational platform and the axis of the gimbal means.

6. A platform stabilization system for a platform carried by a movable vehicle and comprising an electrical power supply carried by the vehicle, gimbal means operably connected between the vehicle and the platform to provide two degrees of rotational freedom of movement of the platform with respect to the vehicle, sensing means secured to the platform for determination of an out-of-level condition of the platform, electromagnetic platform erection means operably connected to the platform, the gimbal means and the vehicle, and electronic control means operably connected between the sensing means and the erection means whereby upon the sensing of any out-of-level condition of the platform, the sensing means provides an electrical signal to the control means which in turn provides electrical power from the power supply to create an electromagnetic field within the erection means thereby effecting erection of the said platform to a level condition, wherein the gimbal means comprises a gimbal frame which is rotatably secured to the vehicle, the platform being rotatably connected to the gimbal frame, the axis of rotation of the platform with respect to the gimbal frame being disposed perpendicularly to the axis of rotation of the gimbal frame with respect to the vehicle, wherein the electromagnetic platform erection means comprises a first electromagnetic coil means having an aperture therein, the said coil means being operably connected to the electronic control means and secured to the gimbal frame, a first core means secured to the platform and reciporocally disposed within the aperture of the said first electromagnetic coil means whereby upon the application of electrical power from the power supply to the said coil means, electromagnetic force will be applied to the core means thereby effecting rotation of the platfrom with respect to the gimbal frame and a second electromagnetic coil means having an aperture therein, the said coil means being operably connected to the electronic control means and secured to the vehicle and a second core means secured to the gimbal frame and reciprocally disposed within the aperture of the second coil means whereby upon application of electrical power from the power supply to the second electromagnetic coil means, electromagnetic force will be applied to the second core means thereby effecting rotation of the gimbal frame with respect to the vehicle.

7. A platform stabilization system as set forth in claim 6 wherein the first core means comprises a first elongated bar connected at one end thereof to the platform at a point in alignment with the axes of rotation of the platform with respect to the gimbal frame and a first arcuate metallic rod connected to the opposite end of the first elongated bar, each point along the axis of the first arcuate rod being equal distance from the said axis of rotation of the platform with respect to the gimbal frame and wherein the first electromagnetic coil means comprises a pair of spaced substantially identical oppositely disposed annular shaped electrical coils the first coil having an arcuate shaped aperture therein for receiving one end of the first arcuate shaped rod, the second said coil having a substantially identical arcuate aperture therein for receiving the opposite end of the said first arcuate rod therein, the said coils being secured to the gimbal means and oppositely disposed on either side of the first elongated bar whereby upon rotation of the platform with respect to the gimbal means, each end of the said first arcuate metallic rod will freely pass within the coils, each of the said coils being connected to the electronic control means; and wherein the second core means comprises a second elongated bar having one end thereof secured to the gimbal frame at a point in substantial alignment with the axis of rotation of the gimbal frame with respect to the vehicle and having a second arcuate rod secured to the opposite end thereof and disposed with every point along the axis of the said second arcuate rod being equal distance from the said axis of rotation of the gimbal frame with respect to the vehicle and wherein the second electromagnetic coil means comprises a pair of substantially identical annular shaped electrical coils, the first said coil having an arcuate shaped aperture therein for receiving one end of the said second arcuate rod therethrough and the other said coil having a substantially identical arcuate aperture therein for receiving the opposite end of the second arcuate rod therethrough, said coils being secured to the vehicle and oppositely disposed on either side of the second elongated bar whereby upon rotation of the gimbal means with respect to the vehicle each end of the said arcuate rod will pass freely through the coils, each of the said coils being electrically connected to the electronic control means.

8. A platform stabilization system for a platform carried by a movable vehicle comprising an electrical power supply carried by the vehicle, a gimbal means rotatably secured to the vehicle, the axis of rotation thereof being horizontally disposed with respect to the said vehicle when the vehicle is level, the platform rotatably carried by the said gimbal means, the axis of rotation thereof being horizontally disposed with respect to the said vehicle when the vehicle is level, the platform rotatably carried by the said gimbal means, the axis of rotation thereof being perpendicular to the axis of rotation of the gimbal means with respect to the vehicle and horizontal with respect to the vehicle when level, roll sensing means secured to the platform for sensing an out-of-level condition of the said platform with respect to the vehicle about the axis of rotation of the gimbal means with respect to the vehicle, pitch sensing means secured to the platform for sensing an out-of-level condition of the said platform with respect to the vehicle about the axis of rotation of the platform with respect to the gimbal means, electromagnet roll erection means for effecting platform erection with respect to the vehicle about the axis of rotation and the gimbal means with respect to the said vehicle, said roll erection means comprising roll electromagnet coil means for creating a magnetic field and roll core means movable with respect to the roll electromagnet coil means, electromagnet pitch erection means for effecting erection of the platform with respect to the vehicle about the axis of rotation of the said platform with respect to the gimbal means, said pitch erection means comprising pitch electromagnet coil means for creating a magnetic field and pitch core means movable with respect to the pitch electromagnet coil means, electronic roll control means operably connected between the roll sensing means and the electromagnetic roll erection means and electronic pitch control means operably connected between the pitch sensing means and the electromagnetic pitch erection means whereby upon the sensing of an out-of-level condition of the platform about the axis of rotation of the gimbal means, the pitch sensing means provides an electrical signal to the pitch control means which in turn provides electrical power from the power supply to create an electromagnetic field within the pitch erection means thereby effecting erection of the said platform about the axis of rotation of the platform with respect to the gimbal means.

9. A platform stabilization system for a platform carried by a movable vehicle comprising an electrical power supply carried by the vehicle, a gimbal means rotatably secured to the vehicle, the axis of rotation thereof being horizontally disposed with respect to the said vehicle when the vehicle is level, the platform rotatably carried by the said gimbal means, the axis of rotation thereof being perpendicular to the axis of rotation of the gimbal means with respect to the vehicle and horizontal with respect to the vehicle when level, roll sensing means secured to the platform for sensing an out-of-level condition of the said platform with respect to the vehicle about the axis of rotation of the gimbal means with respect to the vehicle, pitch sensing means secured to the platform for sensing an out-of-level condition of the said platform with respect to the vehicle about the axis of rotation of the platform with respect to the gimbal means, electromagnetic roll erection means for effecting platform erection with respect to the vehicle about the axis of rotation of the gimbal means with respect to the said vehicle, electromagnetic pitch erection means for effecting erection of the platform with respect to the vehicle about the axis of rotation of the said platform with respect to the gimbal means, electronic roll control means operably connected between the roll sensing means and the electromagnetic roll erection means and electronic pitch control means operably connected between the pitch sensing means and the electromagnetic pitch erection means whereby upon the sensing of an out-of-level condition of the platform about the axis of rotation of the gimbal means, the pitch sensing means provides an electrical signal to the pitch control means which in turn provides electrical power from the power supply to create an electromagnetic field within the pitch erection means thereby effecting erection of the said platform about the axis of rotation of the platform with respect to the gimbal means, wherein a motor driven stabilizing gyroscope is rotatably secured to the platform, the said gyroscope comprising an axle having its axis of rotation mutually perpendicular to the rotational axis of the gimbal means with respect to the vehicle and the axis of the platform with respect to the gimbal means, the said axle having a massive wheel secured thereto, the plane of the wheel being at a right angle to the axis of the axle and wherein the electromagnetic roll erection means effects erection forces about the axis of rotation of the platform with respect to the gimbal, the resulting force due to the angular momentum of the gyroscope wheel effecting platform erection with respect to the vehicle about the axis of rotation of the gimbal means with respect to the said vehicle, and wherein the electromagnetic pitch erection means effects an erection force on the gimbal means about the axis of rotation of the gimbal means with respect to the vehicle, the resulting force due to the angular momentum of the gyroscope wheel, effecting erection of the platform about the axis of rotation of the platform with the gimbal means.

10. A camera platform stabilization system for a camera platform carried by an aircraft and comprising a motor driven gyroscope rotatably secured within the platform, the axis of rotation thereof being mutually perpendicular to the roll axis of the aircraft and the axis of rotation of the said platform with respect to the gimbal frame, a power supply carried by the aircraft, a gimbal frame rotatably secured to the aircraft, the axis of rotation thereof being parallel to the roll axis of the aircraft, the camera platform rotatably secured to the gimbal frame, the axis of rotation thereof being perpendicular to the axis of rotation of the gimbal frame with respect to the aircraft and parallel to the pitch axis of the aircraft when the said gimbal frame and aircraft is in a level condition, a gravity sensitive roll sensing mercury switch secured to the platform for sensing an out-of-level condition of the said platform with respect to the roll axis of the aircraft, a gravity sensitive pitch sensing mercury switch secured to the platform for sensing an out-of-level condition of the said platform with respect to the pitch axis of the aircraft, electromagnetic roll erection means comprising a pair of substantially identical roll erection coils, each having an aperture therein secured to the gimbal frame on either side of the axis of rotation of the said platform with respect to the gimbal frame and an arcuate shaped metallic roll core means rigidly secured to the platform having one end thereof movably disposed within the aperture of one of the roll erection coils and the opposite end thereof being movably disposed within the aperture of the other roll erection coil for effecting erection of the platform with respect to the roll axis of the aircraft, electromagnetic pitch erection means comprising a pair of substantially identical oppositely disposed electromagnetic pitch coils each having an aperture therein which are secured to the aircraft and disposed on either side of the axis of rotation of the gimbal frame with respect to the aircraft and an arcuate shaped metallic pitch core means rigidly secured to the gimbal frame and having one end thereof movably disposed within the aperture of one of the pitch coils and the opposite end thereof being movably disposed within the aperture of the other pitch coil for effecting erection of the platform with respect to the vehicle about the pitch axis of the said aircraft, electronic roll control means operably connected between the roll sensing mercury switch and the electromagnetic roll erection means whereby upon the sensing of an out-of-level condition of the platform with respect to the roll axis of the aircraft, the roll sensing mercury switch provides an electrical signal to the roll control means which in turn provides electrical power from the power supply to create an electromagnetic field within the roll erection means thereby creating a corrective force on the platform about the axis of rotation of the platform with respect to the gimbal frame, the resulting force due to the angular momentum of the gyroscope effecting erection of the said platform about the roll axis of the aircraft and whereby upon sensing of an out-of-level condition of the platform with respect to the pitch axis of the aircraft, the pitch sensing mercury switch provides an electrical signal to the pitch control means which in turn provides electrical power from the power supply to create an electromagnetic field within the pitch erection means thereby creating a corrective force on the platform about the axis of rotation of the gimbal frame with respect to the aircraft, the resulting force due to the angular momentum of the gyroscope effecting erection of the said platform about the pitch axis of the aircraft.

11. A platform stabilization system as set forth in claim 10 wherein a pair of substantially identical roll sensitive normally closed single pole, single throw mercury slop switches are secured to the platform, one of the said slop switches for detecting an extreme out-of-level condition of the platform in one direction about the roll axis of the aircraft and the other said slop switch for detecting an extreme out-of-level condition of the platform in the opposite direction about the roll axis of the aircraft, the said slop switches being electrically connected in series with the roll and pitch erection means whereby an extreme roll of the aircraft will cause one of the slop switches to open, thereby electrically disengaging the erection means until the aircraft is substantially level again.

* * * * *